Figure 1:
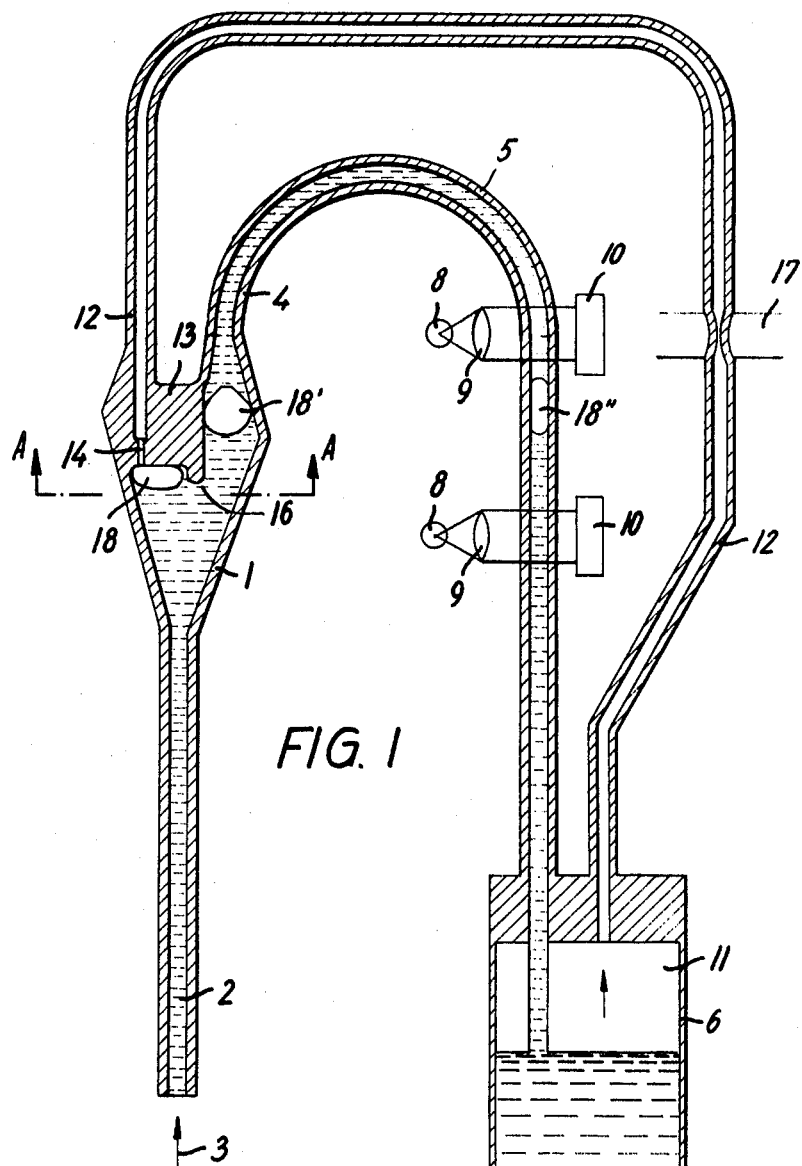

United States Patent

[11] 3,592,057

[72] Inventors Christian Thorkild Boe
  Farum;
  Mogens Myrup Andreasen, Copenhagen;
  Steen Gamwell Dawids, Klampenborg, all of, Denmark
[21] Appl. No. 839,587
[22] Filed July 7, 1969
[45] Patented July 13, 1971
[73] Assignee Instituttet for Produktudvikling
  Lyngby, Denmark
[32] Priority July 10, 1968
[33] Denmark
[31] 3386/68

[54] DEVICE FOR MEASURING LIQUID FLOW RATE
  7 Claims, 2 Drawing Figs.
[52] U.S. Cl. ..................................... 73/194 R,
  128/2.05 F
[51] Int. Cl. ..................................... G01f 1/00
[50] Field of Search ........................... 73/194;
  128/2.05

[56] References Cited
  UNITED STATES PATENTS
  3,308,660  3/1967  De Ford .................... 73/194
  3,333,362  6/1967  Wells ......................... 73/194
  FOREIGN PATENTS
  831,610  2/1952  Germany .................... 73/194

Primary Examiner—Charles A. Ruehl
Attorney—Stevens, Davis, Miller and Mosher

ABSTRACT: A device for measuring liquid flow rate in a duct by introducing a fluid bubble in the duct and measuring the interval between the bubble's passage of two spaced measuring points. To form and introduce the bubble there are provided two chambers in the duct so that the static pressure in the downstream chamber exceeds that in the upstream chamber. The chambers are connected by means of a separate bubble fluid duct opening into a downwardly facing recess in the upstream chamber whereby a fluid bubble is gradually formed and released to the liquid flowing through the chamber.

DEVICE FOR MEASURING LIQUID FLOW RATE

This invention relates to a device for measuring the flow rate of a liquid in a duct by introducing in the duct, a bubble of a fluid having a lower specific gravity than the liquid and being immiscible therewith and measuring the passage time of the bubble between two fixed measuring points spaced along the duct.

When measuring the flow rate of very delicate or sterile liquids, e.g. in the extra-corporal blood circuit in a hemodialysis apparatus, the bubble method has the advantage over other measuring methods, such as the electrodynamic method or the Doppler-effect method, that the liquid does not contact any measuring surfaces which may be difficult to sterilize or which may cause undesired precipitation of constituents from the liquid, e.g. fibrin from blood which as known may cause the blood to coagulate. On the other hand, the method has the inconvenience that it is difficult to introduce the bubble in the liquid in such a way that it fills the cross section of the duct completely. The previous practice has been to introduce an amount of air in the duct manually by means of a probe or cannula, but it is difficult to avoid splitting the amount of air into several bubbles which are too small to fill the duct section completely, and it is also necessary to interrupt the liquid flow during the introduction of the air which changes the stationary flow that should be measured.

The inconveniences pointed out are remedied in the device according to the present invention which is characterized in that a first and a second chamber each having a larger cross-sectional area than the duct are connected in the duct upstream and downstream, respectively, of the measuring point, the second chamber being located at a lower level than the first chamber, and in that the first chamber comprises a liquid inlet, a liquid outlet located at a higher level than the inlet and a downwardly facing recess laterally adjacent the outlet, the bottom of said recess having an opening which is connected to the upper part of the second chamber through a separate duct.

Through a device according to the invention it is possible, without disturbing the liquid flow, to carry out a continuous formation of fluid bubbles and introduction of these bubbles in the liquid in such a way that each bubble completely fills the duct area in the region of the measuring points. From the second or downstream chamber the bubble fluid which in that chamber is separated from the liquid being measured due to the difference in specific gravity, flows continuously back to the first or upstream chamber in which the fluid collects in the form of a steadily increasing bubble in the recess, until the bubble has reached such a size that it escapes below the edge of the recess under the influence of the positive static differential pressure and continues together with the liquid past the measuring point. Since the same amount of fluid circulates continuously in the apparatus it is only necessary to provide a suitable amount of fluid in the system, the balance of which is liquid filled, and such amount of fluid may be introduced by means of a probe or cannula before the measuring operation commences. The device has a very simple structure and can therefore be produced at such low price that it may be thrown away after use, and if necessary, it can easily be sterilized, e.g. by radiation, before being used.

In order to facilitate the formation of a fluid bubble, the lower edge of the recess may be substantially circular when viewed in plan.

The diameter of the recess may be approximately half as large as the diameter of the first chamber at the same horizontal level. In that case the bubble leaving the recess has such a size that it can fill the outlet cross section adjacent the recess completely.

It has proved expedient to provide the edge of the recess with a smoothly rounded cross-sectional profile. The magnitude of the radius or curvature of the edge which influences the stability of the bubble, depends inter alia upon the surface tension in the boundary face between the bubble fluid and the measuring liquid and upon the diameter and depth of the recess.

The cross-sectional area of the opening in the bottom of the recess may be substantially smaller than the area of the separate duct connected thereto. In that case the liquid is effectively prevented from flowing into the separate duct.

In the duct connecting the first and second chambers a variable throttling means may be provided, so that it is possible to control the frequency of the bubble formation by changing the flow rate of the bubble fluid in the separate duct.

The first or upstream chamber may comprise a downwardly tapering lower part in the bottom of which the liquid inlet is provided, and an upper part including an outlet passage tapering in substantially vertical upward direction and said recess, the lower edge of which is located substantially in the region of the maximum cross-sectional area of the chamber. The embodiment ensures a suitably low liquid flow rate in the region of the chamber, in which the bubbles are formed and entrained by the liquid so that the bubble is less liable to break up into smaller bubbles. In the tapering outlet the liquid is accelerated to its normal flow rate, and at the same time the bubble is constricted laterally to ensure that it fills out the duct cross section completely.

Figure 2:
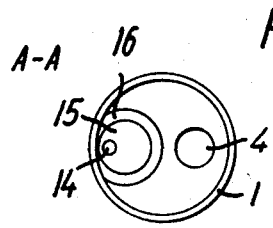

The invention is described in more detail below with reference to the accompanying drawing, in which FIG. 1 is a vertical section through a device embodying the present invention as well as part of the associated measuring equipment, and FIG. 2 is a horizontal section along line A-A in FIG. 1.

The device illustrated in the drawing is intending for measuring the flow rate in the flood circuit of a hemodialysis apparatus, in which a patient's blood is purified by flowing along a diaphragm, while a suitable dialysis liquid flows along the opposite side of the diaphragm. The device comprises a container 1 composed substantially of two conical or tapering portions joined in a horizontal center plane. In the bottom of the container 1 there is an inlet 2 which can be connected to a hose not shown, through which the blood flows into the device in the direction of arrow 3. In its upper part the container 1 has an eccentric outlet 4 which via a transparent hose 5 is connected to the upper part of a second container 6 having an outlet 7 for the blood flow.

In two measuring points suitably spaced along the hose 5 there are provided two light sources 8 with associated collimators 9 and detectors 10. As described in more detail below, as air bubble is introduced at suitable intervals in the liquid flowing through container 1, and when the air bubble passes the two measuring points it produces a signal in the respective detectors 10. The time interval between the two signals is consequently a representative of the liquid flow rate in the hose 5.

As shown in FIG. 1 the container 6 is arranged at a lower level than the container 1, and the height difference is such that the static differential pressure resulting therefrom exceeds the pressure drop due to the liquid flow from container 1 to container 6. Container 6 has such large volume that the interior of the container is not completely occupied by the liquid flowing therethrough, so that an air space 11 is present above the liquid level in container 6. Via a hose 12 the air space 11 is connected to the upper part of container 1 adjacent its outlet 4. At this place the wall of container 1 has an enlargement 13 with a vertical bore to which the hose 12 is connected. The lower portion 14 of the bore is restricted as compared to the hose 12 and opens into the plane bottom surface of a recess 15, the circumference of which is defined by a bead 16 which is circular in plan view, see FIG. 2, and the downwardly facing edge of which has a rounded cross section.

When the liquid flowing through the device contains a certain amount of air which fills the air space 11 in container 6 and the hose 12, the above mentioned static differential pressure between containers 6 and 1 will cause a flow of air upwardly from space 11 through hose 12 and bore 14 to the recess 15. The flow velocity of the air can be controlled by means of an adjustable throttling member 17 mounted on the hose. The member 17 may be a simple clamp for mechanically squeezing or pressing hose 12 together to a smaller or larger extent. Due to the presence of the bead 16, the amount of air flowing into the recess 15 cannot immediately continue into the liquid flowing through container 1, but it will collect to form a steadily increasing bubble, as shown by 18 in FIG. 1. When the bubble has reached a size, so that it substantially fills out the recess 15 and begins to grow down below the edge of bead 16, which is possible due to the above mentioned positive pressure within the bubble, it will—at a certain moment— be entrained by the liquid flow and escape sidewise below the edge of bead 16. When the bubble is clear of the recess it follows the liquid upwardly through outlet 4, at which its cross section is gradually restricted or decreased, as shown at 18' in FIG. 1. In FIG. 1 there is also shown a bubble 18" which completely fills out the cross section of the hose 5 in the region of the detectors 10 at the two measuring points.

The dimensions of the recess 15 and the profile or contour of the defining bead 16 will depend inter alia upon the surface tension in the boundary surface between the bubble and the liquid. A suitable rounding or radiusing of the bead edge has in particular proved expedient in order to avoid the risk of breaking the bubble up into several smaller bubbles, when it escapes from the recess to the liquid flowing through container 1. As mentioned the frequency of the bubble formation can be controlled by means of the throttling member 17. The double tapering shape of the container 1 further reduces the risk of the bubble breaking, because the flow rate or speed of the liquid is relatively low at the region around the maximum cross section of the container, in which the bubble is introduced in the liquid.

The device shown can readily be made entirely of plastic materials, and may be sterilized by radiation before use. Since the device can be produced at a very low price, there are no objections against throwing it away after use, especially if it is used in connection with a hemodialysis apparatus. A device according to the invention can also be utilized for other measurements of liquid flow. The bubbles may be formed by air or any other gas, which is compatible with the liquid, e.g. argon. For certain applications the bubbles may possibly be formed of a liquid which does not mix with the liquid, the flow rate of which is to be measured, and which is specifically lighter than said liquid. Such a device may be constructed similar to that shown and comprising a chamber or container in which the bubbles are formed, and a second chamber located downstream of the first chamber, whereby the lighter liquid may be separated from the measuring liquid in the second chamber. In that chamber there will prevail a positive pressure sufficient for driving the bubble fluid back to the bubble chamber and ensure the formation and introduction of the bubbles into the liquid. In the embodiment shown, the outlet from the bubble chamber extends vertically upwards but this is no absolute condition, since the outlet may have a smaller inclination with respect to the horizontal plane.

What we claim is:

1. A device for measuring the flow rate of a liquid flowing through a duct, comprising two measuring points spaced along said duct, means for initially introducing a gas having a lower specific gravity than said liquid and being immiscible therewith into said device, means for measuring the passage time of a bubble of said gas between said measuring points, means defining a first chamber having a larger cross-sectional area than said duct, said first chamber having a liquid inlet, a liquid outlet located at a higher level than said inlet and connected to the upstream end of said duct, said upstream duct end extending initially in a generally upward direction from said liquid outlet, a downwardly facing recess laterally adjacent said outlet and an opening in the bottom of said recess, means defining a second chamber located at a lower level than said first chamber and having a larger cross-sectional area than said duct, said second chamber having a liquid inlet connected to the downstream end of said duct, a liquid outlet and a gas outlet in the upper part of said second chamber, and a gas duct connecting said gas outlet with said opening in said recess of said first chamber.

2. A device as claimed in claim 1, wherein the lower edge of said recess is substantially circular when viewed in plan.

3. A device as claimed in claim 2, wherein the diameter of said recess is approximately half as large as the diameter of said first chamber at the same horizontal level.

4. A device as claimed in claim 1, wherein the edge of said recess has a smoothly rounded cross-sectional profile.

5. A device as claimed in claim 1, wherein the cross-sectional area of said opening in the bottom of said recess is substantially less than the area of said gas duct connected thereto.

6. A device as claimed in claim 1, wherein a variable throttling means is provided in said gas duct connecting said first and second chambers.

7. A device as claimed in claim 1, wherein said first chamber comprises a downwardly tapering lower part and an upper part, said liquid inlet being provided in the bottom of said lower part, and said upper part includes an outlet passage tapering in substantially vertical upward direction towards said liquid outlet, the lower edge of said recess being located in said upper part substantially in the region of the maximum cross-sectional area of said first chamber.